(12) United States Patent
Sbabo

(10) Patent No.: US 12,091,157 B2
(45) Date of Patent: Sep. 17, 2024

(54) ACTUATOR FOR PITCH CONTROL FOR A ROTOR SYSTEM OF AN AIRCRAFT

(71) Applicant: Lockheed Martin Corporation, Bethesda, MD (US)

(72) Inventor: Thomas L. Sbabo, Hamden, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 15 days.

(21) Appl. No.: 17/939,752

(22) Filed: Sep. 7, 2022

(65) Prior Publication Data
US 2024/0076032 A1 Mar. 7, 2024

(51) Int. Cl.
*B64C 11/32* (2006.01)

(52) U.S. Cl.
CPC .................... *B64C 11/32* (2013.01)

(58) Field of Classification Search
CPC .............. B64C 11/32; B64C 11/30
See application file for complete search history.

(56) References Cited

U.S. PATENT DOCUMENTS

| 4,753,572 | A | * | 6/1988 | Kusiak | B64C 11/30 416/157 R |
| 6,929,215 | B2 | * | 8/2005 | Arlton | A63H 27/12 244/17.11 |
| 8,172,530 | B2 | | 5/2012 | Perkinson | |
| 8,757,976 | B2 | | 6/2014 | Morgan | |
| 10,295,029 | B2 | | 5/2019 | Davies | |
| 2020/0017207 | A1 | * | 1/2020 | Alber | B64C 27/06 |

* cited by examiner

*Primary Examiner* — Michael L Sehn
(74) *Attorney, Agent, or Firm* — Michael Best & Friedrich LLP

(57) ABSTRACT

A propeller assembly for an aircraft includes a main shaft rotatable about a propeller axis, a rotor hub mounted to the main shaft, and a plurality of blades coupled to the rotor hub. Each blade is rotatably coupled to the rotor hub for rotation about a blade rotation axis. A control system rotates each blade about the corresponding blade rotation axis and includes a ball screw coupled to the main shaft for rotation about the propeller axis and configured to translate along the propeller axis, an actuator beam mounted on the ball screw, and a ball nut coupled to the ball screw. When the ball nut rotates relative to the ball screw, the ball screw translates relative to the main shaft along the propeller axis. A differential transmission is configured to rotate the ball nut relative to the ball screw such that the ball screw is translated.

20 Claims, 3 Drawing Sheets

ACTUATOR FOR PITCH CONTROL FOR A ROTOR SYSTEM OF AN AIRCRAFT

STATEMENT OF GOVERNMENT INTEREST

This invention was made with Government support under Agreement No. W911W6-19-9-0005, awarded by the Army Contracting Command-Redstone Arsenal. The Government has certain rights in the invention.

FIELD OF INVENTION

Embodiments described herein relate to aircraft rotor actuators and, in particular, to methods for controlling the pitch of a rotor system.

BACKGROUND

Aircrafts, and specifically vertical take-off and landing (VTOL) aircrafts utilize rotors to provide lift and thrust. A VTOL aircraft with a dual rotor, counter-rotating system may include a tail rotor to provide additional thrust. The tail rotor includes a plurality of rotor blades that must be actuated together to rotate to provide variable pitch angles, which varies the provided thrust. An actuator is coupled to the rotor system to adjust the pitch angles of the rotor blades. Existing actuators must bridge between the non-rotating components and the rotating components, requiring large bearings, lots of lubrication, and careful monitoring.

SUMMARY

Embodiments described herein provide a propeller assembly for an aircraft, the propeller assembly including a main shaft rotatable about a propeller axis, a rotor hub mounted to the main shaft for rotation therewith about the propeller axis, and a plurality of blades coupled to the rotor hub for rotation about the propeller axis. Each one of the plurality of blades is rotatably coupled to the rotor hub for rotation about a blade rotation axis. A control system rotates each of the plurality of blades about the corresponding blade rotation axis. The control system includes a ball screw coupled to the main shaft for rotation about the propeller axis and configured to translate along the propeller axis, an actuator beam mounted on the ball screw and coupled to each of the blades by a corresponding control rod, and a ball nut coupled to the ball screw. Movement of the control rods rotates the blades about the blade axis When the ball nut rotates relative to the ball screw, the ball screw translates relative to the main shaft along the propeller axis. A differential transmission is configured for rotating the ball nut relative to the ball screw such that the ball screw translated relative to the main shaft and the control rods rotate the blades about the blade rotation axis.

Embodiments described herein provide an aircraft including a main body extending along a longitudinal axis between a nose and a tail, a motor, a main rotor assembly mounted on the main body and rotatably driven by the motor to provide lift, a tail rotor, and a pitch control system. The tail rotor includes a main shaft mounted to the tail and rotatably driven by the motor to rotate about a propeller axis, a rotor hub rotatably secured to the main shaft, and a plurality of blades coupled to the rotor hub and circumferentially spaced about the propeller axis. The pitch control system is coupled to the tail rotor to control a pitch of the plurality of blades. The pitch control system includes an actuator beam coupled to the tail rotor for movement along the propeller axis, a ball screw coupled to the actuator beam for movement along the propeller axis relative to the tail rotor, and a ball nut coupled to the main shaft of the tail rotor. The actuator beam is coupled to the plurality of blades such that movement of the actuator beam relative to the rotor hub changes the pitch of the plurality of blades. The ball nut is configured to rotate relative to the ball screw to displace the ball screw along the propeller axis to alter the pitch of the plurality of blades.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
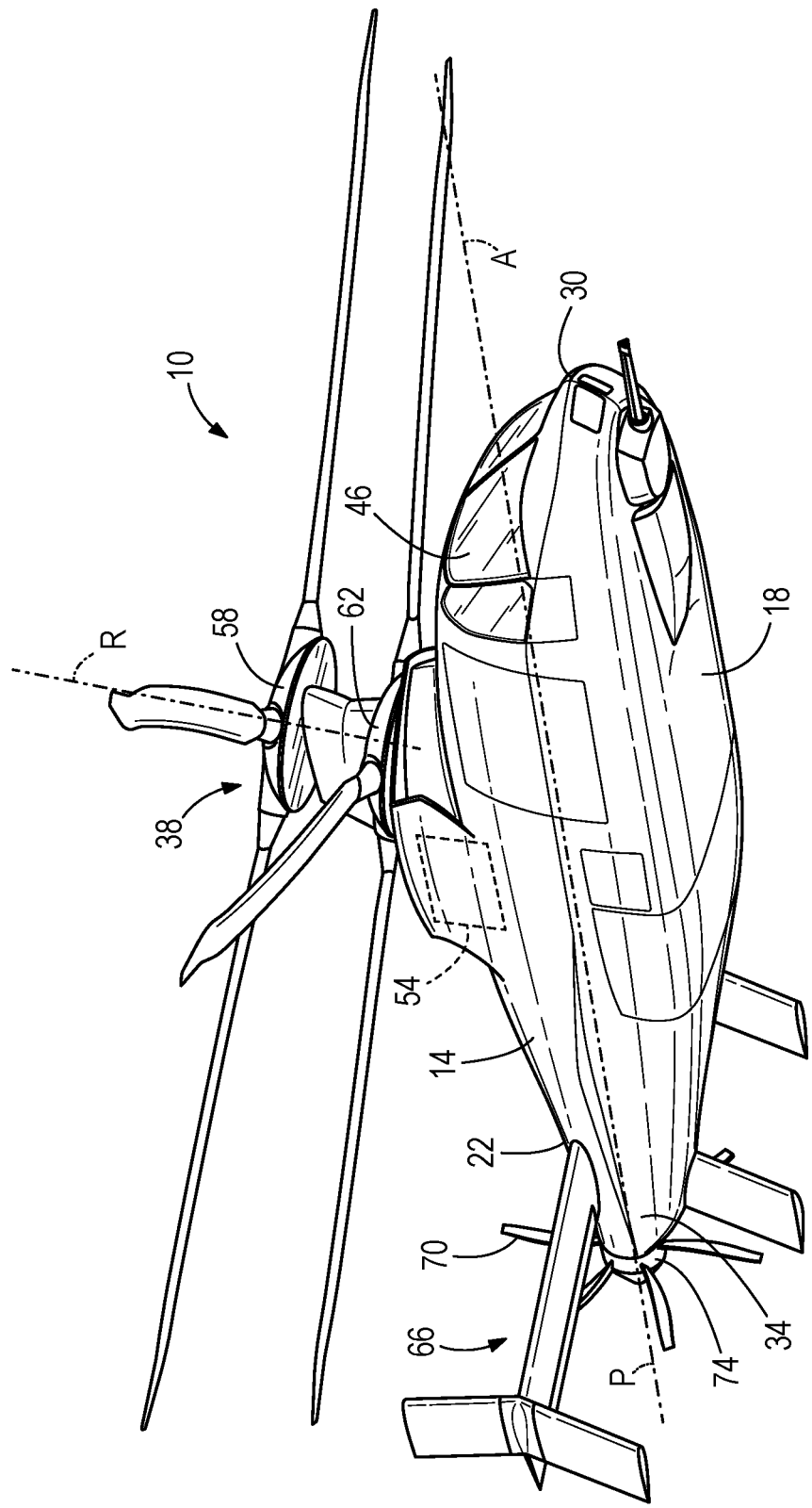
FIG. 1 illustrates an aircraft according to an exemplary embodiment.

Referring now to the figures, FIG. 1 illustrates a vertical take-off and landing (VTOL) aircraft 10 or rotary wing aircraft 10 according to some embodiments. The aircraft 10 includes a main body 14 including an airframe 18 and an empennage 22. The airframe 18 extends along a longitudinal axis A between a nose 30 and a tail 34. The aircraft 10 includes a main rotor assembly 38 coupled to the main body 14 between the nose 30 and the tail 34. In the illustrated embodiment, the main rotor assembly 38 is a dual, counter-rotating, co-axial rotor assembly that rotates about a rotor axis R. The axis R is generally perpendicular to the longitudinal axis A. Other embodiments may include different rotor assembly styles, for example, a single rotor assembly. The main body 14 defines a cockpit 46 in the airframe 18 having one or more seats for flight crew and optional passengers.

The main rotor assembly 38 is driven by a power source, such as, for example, one or more motors via a main rotor gearbox 54. The one or more motors can include an electric motor, a piston engine, a gas turbine, or other device for providing motion. The main rotor assembly 38 includes an upper rotor assembly 58 driven in a first direction (e.g., counter-clockwise) about the rotor axis R, and a lower rotor assembly 62 driven in a second direction (e.g., clockwise)

about the rotor axis R, wherein the second direction is opposite to the first direction (i.e., to provide two counter rotating rotors).

As illustrated in FIG. 1, the aircraft 10 also includes a tail rotor 66 located at the tail 34 to provide translational thrust (forward or rearward) for the aircraft 10. Although FIG. 1 illustrates the tail rotor 66 in the context of a pusher-propeller configuration, in other embodiments, the tail rotor 66 may be a puller-propeller. Similarly, in some embodiments, the tail rotor 66 may be mounted in a static configuration with respect to the aircraft 10 as illustrated in FIG. 1. However, in other embodiments, the tail rotor 66 has a variable position, which allows the tail rotor 66 to provide yaw control in addition to translational thrust. Also, in some embodiments, the aircraft 10 includes more than one pusher-propellers, such as, for example, one positioned on the back left of the aircraft 10 and one positioned on the back right of the aircraft 10.

With continued reference to FIG. 1, the tail rotor 66 includes a plurality of blades 70 mounted to a rotor hub 74. The tail rotor 66 is rotatably mounted to the tail 34 for rotation about a propellor axis P. In the illustrated embodiment, the propeller axis P is parallel to the longitudinal axis A. In some embodiments, the propeller axis P may be coaxial with the longitudinal axis A.

Figure 2:
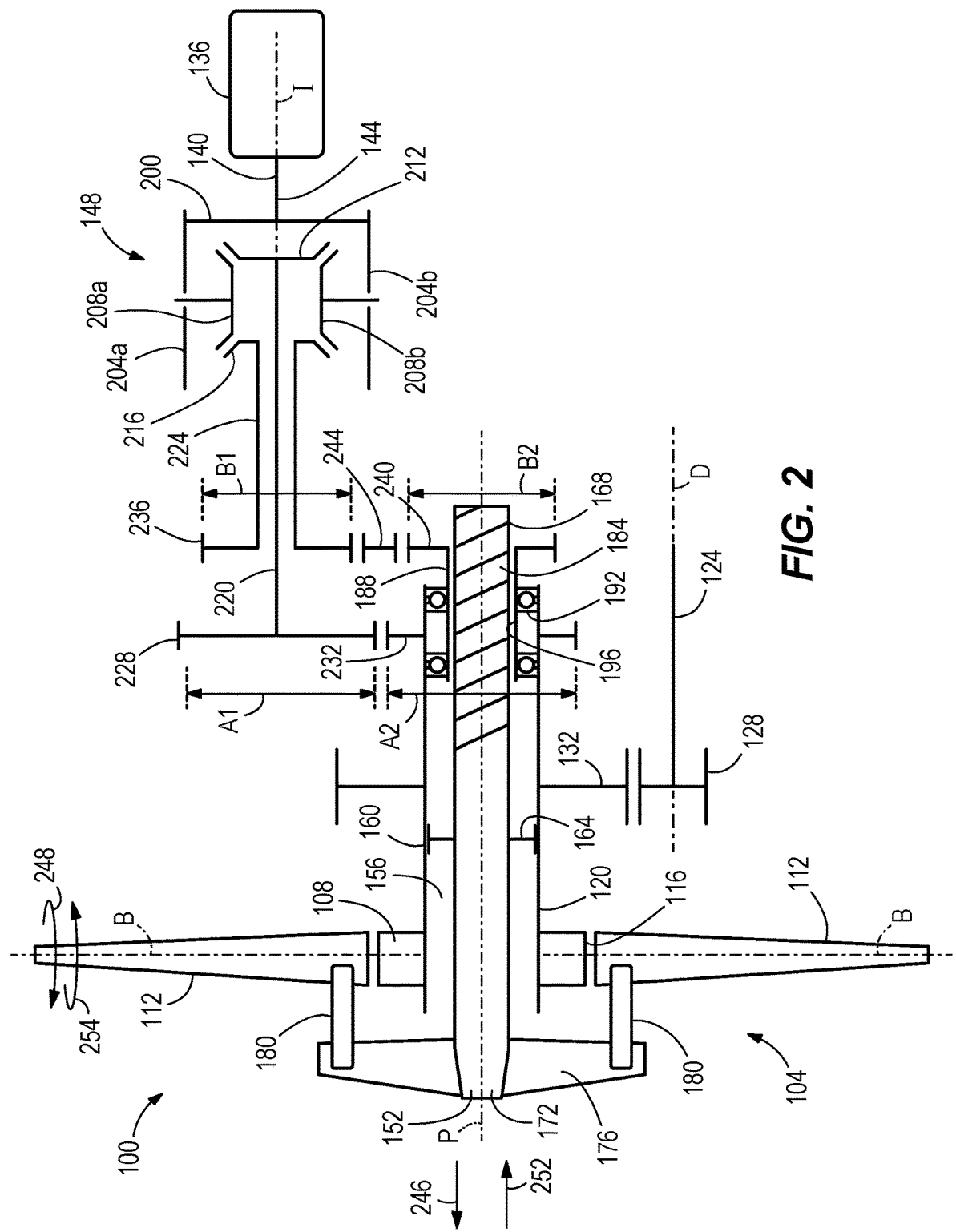
FIG. 2 is a schematic illustration of a first embodiment of a rotor pitch control system of the aircraft of FIG. 1.

FIG. 2 illustrates a schematic representation of a propeller assembly including a pitch control system 100 with a propeller 104. In some embodiments, the propeller 104 is the tail rotor 66 illustrated in FIG. 1. In other embodiments, the propeller 104 may be a different propeller, such as a tail rotor in an aircraft with a single main rotor. The propeller 104 is rotated about a propeller axis P. The propeller 104 includes a rotor hub 108 and a plurality of blades 112 extending from the rotor hub 108. The rotor hub 108 includes an outer circumferential surface 116. The plurality of blades 112 are circumferentially spaced about the outer circumferential surface 116. Each of the blades 112 is rotatably mounted to the outer circumferential surface 116 for rotation about a rotation axis B of the blade 112. Rotation of the blades 112 about the respective rotation axis B changes the pitch of the plurality of blades 112. In embodiments where the propeller 104 is a rear propeller, such as the tail rotor 66, changing the pitch of the blades 112 may change the amount of thrust generated by the tail rotor 66. In embodiments where the propeller 104 is a tail rotor in a single rotor aircraft, changing the pitch of the blades 112 may change the sideways thrust, thereby steering the aircraft about a vertical axis.

The propeller 104 may be mounted for rotation on a main shaft 120. The main shaft 120 may extend along the propeller axis P. The main shaft 120 may connect to the one or more motors through a rear gear box (not shown). The rear gear box may include a drive shaft 124 extending along a drive axis D. The drive shaft 124 may include a drive shaft gear 128. The main shaft 120 may include a main shaft gear 132. The main shaft gear 132 may be integrally formed on the main shaft 120 or may be otherwise fixed to the main shaft 120. Rotation of the drive shaft 124 is therefore transmitted through the drive shaft gear 128 and the main shaft gear 132 to the main shaft 120. In the illustrated embodiment, the drive shaft 124 and the drive axis D are offset from and parallel to the main shaft 120. The drive shaft 124 engages the main shaft 120 at a middle portion thereof. In other embodiments, the drive shaft gear 128 may be a bevel gear, or another type of gear, or the drive shaft 124 may engage the main shaft 120 at a different location.

The rotor hub 108 is mounted on the main shaft 120 and rotates with the main shaft 120 about the propeller axis P. In some embodiments, the rotor hub 108 may be integrally formed on the main shaft 120. In other embodiments, the rotor hub 108 is fixed to the main shaft 120 using any known methods, for example, through fasteners and brackets, through a non-circular profile, etc. The blades 112 rotate with the rotor hub 108 about the propeller axis P.

With continued reference to FIG. 2, the pitch control system 100 includes an electric motor 136. The electric motor 136 is connected to flight controls in the cockpit 46 and can be operated manually by an operator or automatically by a flight control software. The electric motor 136 is drivable in a first direction (or a forward direction) and in a second direction (or a reverse direction). The electric motor 136 includes a motor shaft 140 that is rotatably coupled to an input shaft 144 for a differential transmission 148. In some embodiments, the motor shaft 140 and the input shaft 144 are integrally formed. In other embodiments, additional gearing may be positioned between the motor shaft 140 and the input shaft 144 to alter the torque or speed.

The pitch control system 100 is connected between the electric motor 136 and the propeller 104 to control the pitch of the blades 112 relative to the rotor hub 108. The pitch control system 100 further includes a ball screw 152 extending along the propeller axis P. The ball screw 152 is coupled to the main shaft 120 for rotation therewith. In the illustrated embodiment, the main shaft 120 includes an internal cavity 156 with the ball screw 152 positioned inside the internal cavity 156 of the main shaft 120. The ball screw 152 is axially displaceable with respect to the main shaft 120 along the propeller axis P. In the illustrated embodiment, the main shaft 120 includes an internal geared profile 160 that engages an external geared profile 164 of the ball screw 152. Thus, the ball screw 152 may be constrained to rotate with the main shaft 120 by the interaction between the geared profiles 160 and 164, but may be free to translate along the propeller axis P. In other embodiments, other support methods may be used.

The ball screw 152 extends between a first end 168 and a second end 172. The second end 172 extends from the internal cavity 156 of the main shaft 120 adjacent the rotor hub 108. An actuator beam 176 is mounted at the second end 172 of the ball screw 152. The actuator beam 176 may be coupled to the ball screw 152 to rotate therewith and to translate relative to the main shaft 120 therewith. The actuator beam 176 is coupled to each of the plurality of blades 112 by a corresponding control rod 180. Each control rod 180 is coupled to a portion of the respective blade 112 spaced from the rotation axis B, such that movement of the control rod 180 along the propeller axis P applies a torque to the blade 112 and causes the blade 112 to rotate about the rotation axis B. The rotor hub 108 and, by extension, the plurality of blades 112 are axially fixed to the main shaft 120, such that movement of the actuator beam 176 relative to the main shaft 120 results in linear movement of the control rods 180 relative to the rotor hub 108.

The ball screw 152 includes a grooved surface 184 adjacent the first end 168 of the ball screw 152. In the illustrated embodiment, the grooved surface 184 includes right handed helical grooves that may receive rolling balls. In other embodiments, the helical grooves may be left handed instead. A ball nut 188 is coupled to the main shaft 120 by a set of bearings 192. The bearings 192 are received within the internal cavity 156 and allow the ball nut 188 to rotate relative to the main shaft 120. The ball nut 188 is axially fixed relative to the main shaft 120. The ball nut 188 includes an internally grooved surface 196 that receives the rolling balls in order to couple with the grooved surface 184 of the ball screw 152. Rotation of the ball nut 188 relative to the main shaft 120 causes the internally grooved surface 196 of the ball nut 188 to engage the rolling balls positioned in the grooved surface 184 of the ball screw 152 and axially displace the ball screw 152 relative to the ball nut 188 and the main shaft 120. The ball nut 188 is driven by the differential transmission 148. In some embodiments, a lead screw and a corresponding nut are used instead of a ball screw and ball nut. In these embodiments, threaded interfaces would directly engage to axially translate the ball screw.

With continued reference to FIG. 2, the differential transmission 148 may be coupled between the electric motor 136, the ball nut 188, and the main shaft 120. As discussed above, the input shaft 144 of the differential transmission 148 may be coupled to the motor shaft 140 allowing the electric motor 136 to rotate the input shaft 144 about an input axis I. The differential transmission 148 includes a carrier 200 coupled to the input shaft 144. In the illustrated embodiment, the carrier 200 is directly driven by the input shaft 144. In other embodiments, the input shaft 144 may drive the carrier 200 by way of a bevel gear. In other embodiments, other geared connections may be used. The carrier 200 may include a pair of posts 204a, 204b extending parallel to the input axis I. Rotation of the input shaft 144 may be transmitted to the carrier 200. The posts 204a, 204b are positioned 180 degrees apart around the carrier 200 and rotate with the carrier 200.

The differential transmission 148 also includes a pair of spider gears 208a, 208b. A first spider gear 208a may be coupled to the first post 204a and a second spider gear 208b may be coupled to a second post 204b. Each of the spider gears 208a, 208b are rotatably mounted on the corresponding post so that the spider gears 208 rotate about an axis perpendicular to the input axis I. In some embodiments, the differential transmission 148 may include a single spider gear. In some embodiments, the differential transmission 148 may include more than two spider gears.

A first side gear 212 and a second side gear 216 are mounted between the spider gears 208. The first side gear 212 is coupled to a first shaft 220 and the second side gear 216 is coupled to a second shaft 224. The first shaft 220 includes a first shaft gear 228 that engages a shaft reference gear 232 of the main shaft 120. The second shaft 224 includes a second shaft gear 236 that is coupled to a ball nut gear 240 of the ball nut 188 via an idler gear 244. In some embodiments, the idler gear 244 may be alternately placed between the shaft reference gear 232 and the first shaft gear 228. The first shaft gear 228 has a first shaft gear diameter A1. The shaft reference gear 232 has a shaft reference gear diameter A2. In the illustrated embodiment, the first shaft gear diameter A1 is equal to the shaft reference gear diameter A2. Thus, the first shaft gear 228 may rotate at the same speed as the main shaft 120. The second shaft gear 236 has a second shaft gear diameter B1. The ball nut 188 has a ball nut gear diameter B2. In the illustrated embodiment, the second shaft gear diameter B1 is equal to the ball nut gear diameter B2 such that the ball nut 188 may rotate at the same speed as the second shaft gear 236.

In some embodiments, other gear ratios may be used so that when the motor 136 is turned off the ball nut 188 rotates at the same speed as the main shaft 120. In one embodiment, rather than the first shaft gear diameter A1 being equal to the shaft reference gear diameter A1, and the second shaft gear diameter B1 being equal to the ball nut gear diameter B2, the ratio of the first shaft gear diameter A1 to the shaft reference gear diameter A2 is equal to the ratio of the second shaft gear diameter B1 to the ball nut gear diameter B2, or, expressed as a formula: A1/A2=B1/B2. In some embodiments, instead of comparing the relevant diameters, the associated tooth count may also be used. It would be understood by a person of skill in the art, that the tooth count (or number of teeth) may be used in place of the diameter, as the diameter and tooth count are related by the diametral pitch. Intermeshing gears must have the same diametral pitch, therefore, the diameter and tooth count are correlated. In other words, the relationship between the diameters and the relative rotational speed and the relationship between the tooth count and the relative rotational speed is the same.

In operation, when the electric motor 136 is off or stationary, the pitch of the plurality of blades 112 remains unaltered. The drive shaft 124 transmits rotation to the main shaft 120 via the gears 128, 132. The main shaft 120 rotates the ball screw 152, the rotor hub 108, and the plurality of blades 112 about the propeller axis P. The rotation of the main shaft 120 rotates the shaft reference gear 232, which rotates the first shaft gear 228 and by extension the first side gear 212 at the same speed as the main shaft 120. Because the electric motor 136 is stationary, the carrier 200 does not rotate. Therefore, rotation of the first side gear 212 is transmitted through the spider gears 208 to the second side gear 216, causing it to rotate at the same speed as the first side gear 212, but in the opposite direction. This rotation is transmitted through the second shaft gear 236 and the idler gear 244 to the ball nut gear 240 of the ball nut 188. Therefore, the ball nut 188 rotates at the same speed as the main shaft 120 and the ball screw 152. The ball screw 152 is stationary with respect to the main shaft 120. This arrangement is advantageous as the division between the rotating parts and the non-rotating parts does not require high strength bearings or large amounts of lubrication. Because the ball nut 188 is rotating at the same speed as the main shaft 120, the bearings 192 are not subject to fatigue loading. Instead, the bearings 192 are subjected to static loading. Additionally, little additional energy is needed to maintain the pitch of the blades, as the electric motor 136 can be turned off when the pitch does not need adjusting.

To change the pitch of the plurality of blades 112, the electric motor 136 is operated. An exemplary pitch change operation may occur as follows; however, it would be obvious to a person of skill in the art that many of the components are easily reversable to result in a pitch change in the opposite direction as the one described. These variations are within the scope of the present disclosure and are still an application of the teachings herein. For example, the grooved surface 184 of the ball screw 152 may instead include left hand grooves, reversing the direction of the displacement of the ball screw 152. The control rods 180 may be coupled to the blade 112 at a different position to change the direction of rotation about the rotation axis B caused by the movement of the actuator beam 176. Other variations are also contemplated.

In one exemplary operation, the drive shaft 124 may rotate clockwise and the main shaft 120 may be driven to rotate counterclockwise. The main shaft 120 rotates the shaft reference gear 232 counterclockwise, and the first shaft gear 228, first shaft 220, and first side gear 212 all rotate clockwise. The electric motor 136 is driven to rotate the motor shaft 140, and thereby the input shaft 144 and the carrier 200 in a first, clockwise direction. With the carrier 200 and the first side gear 212 rotating clockwise, the second side gear 216 is driven to rotate faster than the first side gear 212 and in a counterclockwise direction. The rotation is transmitted through the gears 236, 244, 240 to the ball nut 188. The ball nut 188 is driven to rotate counterclockwise at a greater speed than the counterclockwise rotation of the main shaft 120 and of the ball screw 152. Therefore, the ball nut 188 rotates counterclockwise relative to the ball screw 152, and the grooved surfaces 184, 196 engage to displace the ball screw 152 along the propeller axis P in a first axial direction 246, so that the actuator beam 176 moves away from the rotor hub 108. In the illustrated embodiment, the control rods 180 are positioned so that movement of the actuator beam 176 in the first axial direction 246 rotates each of the blades 112 about the respective rotation axis B in a first rotational direction 248 to increase the pitch of the propeller 104. The electric motor 136 may be turned off when a desired pitch is reached, conserving energy, and causing the ball nut 188 to rotate at the same speed as the ball screw 152 once again.

To alter the pitch in the opposite direction, the electric motor 136 is operated to rotate the motor shaft 140, and thereby the input shaft 144 and the carrier 200, in a second, counterclockwise direction. With the carrier 200 rotating in a counterclockwise direction and the first side gear 212 still rotating in the clockwise direction, the second side gear 216, and by extension the ball nut 188, is driven to rotate slower than the first side gear 212, and by extension the ball screw 152. Therefore, the ball nut 188 rotates clockwise relative to the ball screw 152, and the grooved surfaces 184, 196 engage to displace the ball screw 152 along the propeller axis P in a second axial direction 252, so that the actuator beam 176 moves towards the rotor hub 108. In the illustrated embodiment, the control rods 180 are coupled to the blades 112 so that movement of the actuator beam 176 in the second axial direction 252 rotates each of the blades 112 about the respective rotation axis B in a second rotational direction 254 to decrease the pitch of the propeller 104. The electric motor 136 may be turned off when a desired pitch is reached, causing the ball screw 152 to stop translating along the propeller axis P.

When the pitch control system 100 is adjusting the pitch of the propeller 104, the difference in speed between the ball screw 152 and the ball nut 188 is relatively small. The bearings 192 are subject to fatigue loading only when a pitch change is actively occurring, meaning that the bearings 192 do not need large amounts of lubrication and do not need to be heavy duty. Instead, lighter bearings can be used, decreasing the weight of the pitch control system 100 and the aircraft 10 overall.

Figure 3:
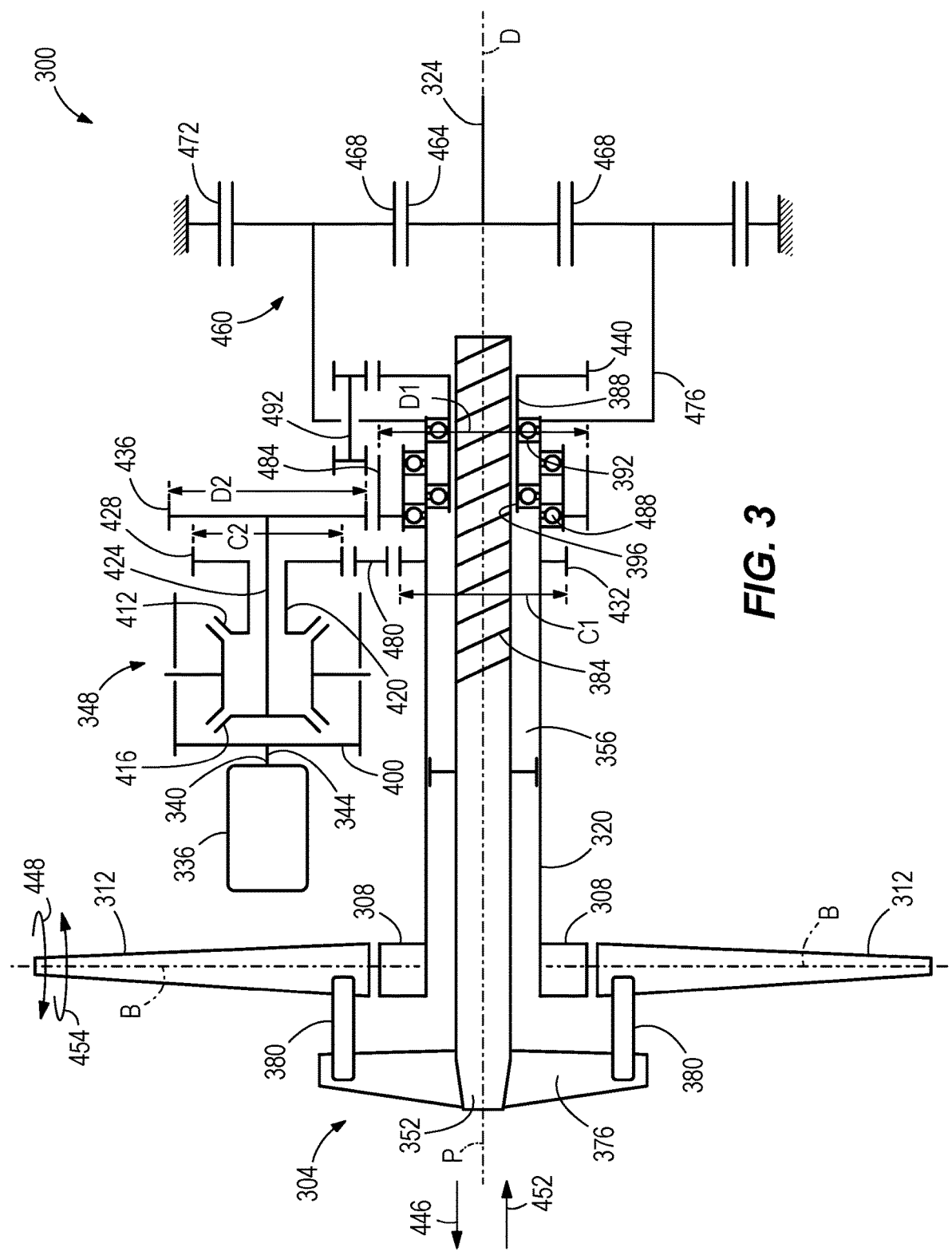
FIG. 3 is a schematic illustration of a second embodiment of a rotor pitch control system of the aircraft of FIG. 1.

FIG. 3 illustrates a schematic view of a second embodiment of a pitch control system 300. The pitch control system 300 is similar to the pitch control system 100 illustrated in FIG. 2 and only the differences of the pitch control system 300 are described. Similar components are given similar reference numerals plus 200.

The pitch control system 300 includes a propeller 304 including a rotor hub 308 and a plurality of blades 312. The rotor hub 308 is mounted on a main shaft 320 extending along a propeller axis P. The main shaft 320 is driven by a drive shaft 324 through a planetary transmission 460. The planetary transmission 460 includes a sun gear 464 directly coupled to the drive shaft 324. The sun gear 464 engages a set of planet gears 468. The set of planet gears 468 are surrounded by a stationary ring gear 472 that is fixed inside the tail 34. The set of planet gears 468 are coupled to a planet carrier 476 that is coupled to the main shaft 320. Rotation of the drive shaft 324 is transmitted through the planetary transmission 460 by rotating the sun gear 464, which rotates the planet gears 468 about the propeller axis P. The planet carrier 476 is therefore rotated and transmits rotation to the main shaft 320. In the illustrated embodiment, the drive shaft 324 is coaxial with the main shaft 320 and parallel to the propeller axis P.

With continued reference to FIG. 3, the pitch control system 300 includes a ball screw 352 positioned within an internal cavity 356 of the main shaft 320. A ball nut 388 is positioned in the internal cavity 356 by bearings 392 to surround the ball screw 352. An internally grooved surface 396 of the ball nut 388 interacts with rolling balls and a grooved surface 384 of the ball screw 352 to linearly displace the ball screw 352 and an actuator beam 376 attached to the ball screw 352 along the propeller axis P. The ball nut 388 includes a ball nut gear 440 positioned past the main shaft 320, between the planet carrier 476 and the sun gear 464.

The pitch control system 300 includes a differential transmission 348 coupled between an electric motor 336, the main shaft 320, and the ball nut 388. The differential transmission 348 includes a first side gear 412 coupled to a first shaft 420 and a second side gear 416 coupled to a second shaft 424. The first shaft 420 includes a first shaft gear 428 that rotatably engages a shaft reference gear 432 of the main shaft 320 through a shaft idler gear 480. In some embodiments, the idler gear 480 may be alternately placed between the second shaft gear 436 and the intermediary gear 484. In the illustrated embodiment, the shaft reference gear 432 has a shaft reference gear diameter C1 that is equal to a first shaft gear diameter C2 of the first shaft gear 428. Thus, the first shaft gear 428 is driven to rotate at the same speed as the main shaft 320 and in the same direction.

The second shaft 424 includes a second shaft gear 436 that engages an intermediary gear 484. The intermediary gear 484 is supported on the main shaft 320 by a set of outer bearings 488, such that the intermediary gear 484 is free to rotate with respect to the main shaft 320. One or more pinions 492 engage the intermediary gear 484 and extend through openings in the planet carrier 476. The pinions 492 transmit rotation from the intermediary gear 484 to the ball nut gear 440 positioned within the planet carrier 476. In the illustrated embodiment, the intermediary gear 484 has an intermediary gear diameter D1 that is equal to a second shaft gear diameter D2. Therefore, the ball nut 388 rotates at the same speed as the second shaft gear 436, but in the opposite direction. In other embodiments, other gear ratios may be used so that when the electric motor 336 is off the ball nut 388 rotates at the same speed as the main shaft 320 and the intermediary gear 484 rotates at the same speed as the main shaft 320. In one embodiment, the diameters may be selected in order to keep the ratio between C1 and C2 the same as the ratio between D1 and D2, or, expressed as a formula: $C1/C2=D1/D2$. As discussed above, in some embodiments, the tooth count of each gear may be used and selected instead of, or along with, the diameter.

In one exemplary operation, the drive shaft 324 is rotated in a clockwise direction by the one or more motors. The drive shaft 324 drives the sun gear 464 to rotate clockwise, and the planetary transmission 460 drives the planet carrier 476 to rotate clockwise as well. The planet carrier 476 transmits the clockwise rotation to the main shaft 320. The main shaft 320 rotates the rotor hub 308 and the plurality of blades 312 clockwise. The clockwise rotation of the main shaft 320 may be transmitted through the shaft reference gear 432 and the shaft idler gear 480 to the first shaft gear 428. Thus, the first shaft 420 and first side gear 412 rotate clockwise. When the electric motor 336 is turned off or stationary, the second side gear 416 rotates counterclockwise at the same speed as the first side gear 412. The rotation of the second side gear 416 is transmitted through the second shaft gear 436 to the intermediary gear 484, causing the intermediary gear 484 to rotate clockwise at the same speed as the main shaft 320. Thus, the outer bearings 488 are only subject to static loading when the motor 336 is off. The intermediary gear 484 engages the pinions 492 to rotate counterclockwise. The pinions 492 may engage the ball nut gear 440 to rotate clockwise. Because of the equal diameters of D1 and D2, the ball nut 388 is driven to rotate at the same speed as the main shaft 320. Therefore, the bearings 392 are also only subject to static loading while the motor 336 is off. The ball nut 388 is stationary relative to the ball screw 352, and the ball screw 352 is stationary relative to the main shaft 320. Therefore, the pitch of the blades 312 does not change.

The electric motor 336 may be operated to rotate the motor shaft 340, and thus the input shaft 344 and the carrier 400, in a first, clockwise direction. With the first side gear 412 and the carrier 400 rotating clockwise, the second side gear 416 is driven to rotate counterclockwise at a greater speed than the first side gear 412. The rotation of the second side gear 416 is transmitted through the second shaft gear 436 to the intermediary gear 484, which rotates clockwise at a greater speed than the main shaft 320. The outer bearings 488 are subject to fatigue loading while the motor 336 operates and the pitch change operation occurs. The intermediary gear 484 engages the pinions 492, which rotate the ball nut gear 440. Thus, the ball nut 388 rotates clockwise at a greater speed than the main shaft 320 and the bearings 392 are also subject to fatigue loading while the motor operates 336. Therefore, the ball nut 388 rotates clockwise with respect to the ball screw 352. The internally grooved surface 396 engages the rolling balls and the grooved surface 384 and linearly displaces the ball screw 352 relative to the main shaft 320 along the propeller axis P. The ball screw 352 translates along the propeller axis P in a second axial direction 452 so that the actuator beam 376 moves toward the rotor hub 308. In the illustrated embodiment, the control rods 380 are mounted on the blades 112 so that movement of the actuator beam 376 in the second axial direction 452 toward the rotor hub 308 rotates the blades 112 about the rotation axis B in a second rotational direction 454 to decrease the pitch of the propeller 304. The electric motor 336 can be turned off when the desired pitch has been reached.

The electric motor 336 may be operated to rotate the motor shaft 340, and thus the input shaft 344 and the carrier 400, in a second, counterclockwise direction. With the first side gear 412 rotating clockwise and the carrier 400 rotating counterclockwise, the second side gear 416 is driven to rotate counterclockwise at a lesser speed than the first side gear 412. The rotation of the second side gear 416 is transmitted through the second shaft gear 436, the intermediary gear 484, the pinions 492, and the ball nut gear 440 to rotate the ball nut 388 clockwise at a lower speed than the main shaft 320. The outer bearings 488 and the bearings 392 are subject to fatigue loading while the motor operates 336. The ball nut 388 rotates counterclockwise relative to the ball screw 352. The grooved surfaces 396, 384 cooperate to displace the ball screw 352 along the propeller axis P in the first axial direction 446, such that the actuator beam 376 moves away from the rotor hub 308. In the illustrated embodiment, the control rods 380 are coupled to the blades 112 so that movement of the actuator beam 376 away from the rotor hub 308 rotates the blades 312 about the respective rotation axis B in a first rotational direction 448 to increase the pitch. The electric motor 336 can be turned off when the desired pitch has been reached. As the outer bearings 488 and the bearings 392 are only subject to fatigue loading while the motor 336 is operating and a pitch change operation is occurring, lighter bearings and less lubrication can be used to achieve the same result as previous designs.

Embodiments disclosed herein are primarily for exemplary purposes. It should be understood that alternative embodiments or various combinations of features described herein may be implemented.

Various features and advantages of the embodiments described herein are set forth in the following claims.

What is claimed is:

1. A propeller assembly for an aircraft, the propeller assembly comprising:
 a main shaft rotatable about a propeller axis;
 a rotor hub mounted to the main shaft for rotation therewith about the propeller axis;
 a plurality of blades coupled to the rotor hub for rotation about the propeller axis, wherein each one of the plurality of blades is rotatably coupled to the rotor hub for rotation about a blade rotation axis; and
 a control system for rotating each of the plurality of blades about the corresponding blade rotation axis, the control system including
  a ball screw coupled to the main shaft for rotation about the propeller axis and configured to translate along the propeller axis,
  an actuator beam mounted on the ball screw and coupled to each of the blades by a corresponding control rod so that a movement of the control rods rotates the blades about the blade rotation axis,
  a ball nut coupled to the ball screw, such that when the ball nut rotates relative to the ball screw the ball screw translates relative to the main shaft along the propeller axis, and
  a differential transmission configured for rotating the ball nut relative to the ball screw such that the ball screw is translated relative to the main shaft and the control rods rotate the blades about the blade rotation axis.

2. The propeller assembly of claim 1, wherein the differential transmission includes:
 a carrier configured to be driven by a motor;
 a first side gear configured to be driven by the main shaft; and
 a second side gear that drives the ball nut.

3. The propeller assembly of claim 2, wherein when the motor is off, the first side gear rotates at a same speed as the second side gear such that the ball nut rotates at the same speed as the ball screw.

4. The propeller assembly of claim 2, wherein when the motor drives the carrier in a first direction, the ball nut rotates faster than the ball screw, and the ball screw translates along the propeller axis in a first axial direction, wherein movement of the ball screw in the first axial direction moves the actuator beam and the control rods in the first axial direction, rotating each of the blades about the corresponding blade rotation axis to alter a pitch of the plurality of blades.

5. The propeller assembly of claim 2, wherein when the motor drives the carrier in a second direction, the ball nut rotates slower than the ball screw and the ball screw translates along the propeller axis in a second axial direction, moving the actuator beam and the control rods in the second axial direction, rotating each of the plurality of blades about the corresponding blade rotation axis to alter a pitch of the plurality of blades.

6. The propeller assembly of claim 2, wherein the first side gear rotates at a same speed as the main shaft and the second side gear rotates at a same speed as the ball nut.

7. The propeller assembly of claim 2, wherein the ball nut is coupled to the second side gear by an idler gear such that the ball nut rotates in the same direction as the second side gear.

8. The propeller assembly of claim 1, wherein the main shaft includes an internal cavity and wherein the ball screw is at least partially received in the internal cavity.

9. The propeller assembly of claim 8, wherein the main shaft includes an internal profile, and the ball screw includes an external profile that corresponds to the internal profile to prevent the ball screw from rotating relative to the main shaft.

10. The propeller assembly of claim 8, wherein the ball nut is at least partially supported in the internal cavity to surround a portion of the ball screw, wherein the ball nut is supported in the internal cavity by bearings.

11. The propeller assembly of claim 1, wherein the ball screw is fixed to co-rotate with the main shaft.

12. The propeller assembly of claim 1, wherein the rotor hub is mounted to the main shaft adjacent a rotor end and wherein the ball nut is supported adjacent a base end opposite the rotor end.

13. An aircraft comprising:
a main body extending along a longitudinal axis between a nose and a tail;
a motor;
a main rotor assembly mounted on the main body and rotatably driven by the motor to provide lift;
a tail rotor including a main shaft mounted to the tail and rotatably driven by the motor to rotate about a propeller axis, a rotor hub rotatably secured to the main shaft, and a plurality of blades coupled to the rotor hub and circumferentially spaced about the propeller axis; and
a pitch control system coupled to the tail rotor to control a pitch of the plurality of blades, the pitch control system including
an actuator beam coupled to the tail rotor for movement along the propeller axis, wherein the actuator beam is coupled to the plurality of blades such that movement of the actuator beam relative to the rotor hub changes the pitch of the plurality of blades,
a ball screw coupled to the actuator beam for movement along the propeller axis relative to the tail rotor, and
a ball nut coupled to the main shaft of the tail rotor and configured to rotate relative to the ball screw to displace the ball screw along the propeller axis to alter the pitch of the plurality of blades.

14. The aircraft of claim 13, wherein the propeller axis is parallel to the longitudinal axis.

15. The aircraft of claim 13, wherein the main shaft is driven by the motor via a drive shaft, wherein the main shaft includes a main shaft gear configured to be rotated by a drive shaft gear of the drive shaft, wherein the drive shaft extends along a drive axis parallel to and spaced from the propeller axis and rotates in an opposite direction to the main shaft.

16. The aircraft of claim 13, wherein the main shaft is driven by the motor via a planetary transmission including a drive shaft extending along the propeller axis.

17. The aircraft of claim 13, wherein the main shaft includes an internal cavity and wherein the ball screw is at least partially received in the internal cavity.

18. The aircraft of claim 13, wherein the pitch control system includes a differential transmission configured to rotate the ball nut relative to the ball screw, wherein the differential transmission includes:
a carrier configured to be driven by the motor;
a pair of spider gears rotatably supported on the carrier;
a first side gear configured to rotate with the main shaft; and
a second side gear configured to rotate with the ball nut.

19. The aircraft of claim 18, wherein when the motor is stationary, the first side gear rotates at a same speed as the second side gear.

20. The aircraft of claim 18, wherein when the motor rotates the carrier, the first side gear rotates at a different speed than the second side gear and the ball nut rotates relative to the ball screw such that the ball screw is displaced along the propeller axis to alter the pitch of the plurality of blades.

* * * * *